US011113493B2

(12) United States Patent
Matsuda et al.

(10) Patent No.: US 11,113,493 B2
(45) Date of Patent: Sep. 7, 2021

(54) BIOMETRIC AUTHENTICATION SYSTEM

(71) Applicant: Hitachi, Ltd., Tokyo (JP)

(72) Inventors: Yusuke Matsuda, Tokyo (JP); Yo Nonomura, Tokyo (JP); Naoto Miura, Tokyo (JP); Keiichiro Nakazaki, Tokyo (JP); Akio Nagasaka, Tokyo (JP); Takafumi Miyatake, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 7 days.

(21) Appl. No.: 16/640,663

(22) PCT Filed: Sep. 11, 2018

(86) PCT No.: PCT/JP2018/033656
§ 371 (c)(1),
(2) Date: Feb. 20, 2020

(87) PCT Pub. No.: WO2019/130670
PCT Pub. Date: Jul. 4, 2019

(65) Prior Publication Data
US 2020/0356751 A1    Nov. 12, 2020

(30) Foreign Application Priority Data
Dec. 27, 2017 (JP) .............................. JP2017-252194

(51) Int. Cl.
*G06K 9/00* (2006.01)
*G06F 21/32* (2013.01)
(Continued)

(52) U.S. Cl.
CPC ......... *G06K 9/00013* (2013.01); *G06F 21/32* (2013.01); *G06K 9/6215* (2013.01);
(Continued)

(58) Field of Classification Search
CPC ............. G06K 9/00013; G06K 9/6215; G06K 2009/0006; G06F 21/32; G06T 7/0012; G06T 2207/30101
See application file for complete search history.

(56) References Cited

U.S. PATENT DOCUMENTS

2012/0230555 A1*  9/2012  Miura ................ G06K 9/00926
                                              382/124
2013/0259328 A1* 10/2013  Hama ................ G06K 9/00087
                                              382/124
(Continued)

FOREIGN PATENT DOCUMENTS

JP    2010-79448 A    4/2010
JP    2014-16822 A    1/2014
(Continued)

OTHER PUBLICATIONS

International Search Report and Written Opinion for related International Application No. PCT/JP2018/033656, dated Nov. 13, 2018; English translation of ISR provided (7 pages).

*Primary Examiner* — John B Strege
(74) *Attorney, Agent, or Firm* — Procopio, Cory, Hargreaves & Savitch LLP

(57) ABSTRACT

It is provided a biometric authentication system, which is configured to execute authentication by using registered biometric information, the biometric authentication system comprising: a light source unit configured to irradiate a living body with light; an image pickup unit configured to photograph a vessel image with light radiated from the light source unit and transmitted through the living body; a control unit configured to generate authentication biometric information from the vessel image photographed by the image pickup unit; a category selection unit configured to select a category that corresponds to the authentication biometric information, based on supplementary information
(Continued)

including information that has been obtained about a position and posture of the living body at timing of photographing the vessel image; and an authentication unit configured to execute authentication processing by comparing registered biometric information of the selected category and the authentication biometric information.

12 Claims, 12 Drawing Sheets

(51) Int. Cl.
  *G06K 9/62* (2006.01)
  *G06T 7/00* (2017.01)
(52) U.S. Cl.
  CPC .... *G06T 7/0012* (2013.01); *G06K 2009/0006* (2013.01); *G06T 2207/30101* (2013.01)

(56) References Cited

U.S. PATENT DOCUMENTS

| | | |
|---|---|---|
| 2014/0010415 A1 | 1/2014 | Kunieda et al. |
| 2015/0154474 A1 | 6/2015 | Nada et al. |
| 2018/0189551 A1 | 7/2018 | Ranganath et al. |
| 2018/0247142 A1* | 8/2018 | Oda .................... G06K 9/2027 |

FOREIGN PATENT DOCUMENTS

| | | |
|---|---|---|
| JP | 2015-106386 A | 6/2015 |
| WO | 2017/004464 A1 | 1/2017 |

* cited by examiner

| CATEGORY | FEATURE AMOUNT | REGISTRATION DATE | ID | QUALITY |
|---|---|---|---|---|
| | | | | |
| | | | | |
| | | | | |

BIOMETRIC INFORMATION DATABASE 518

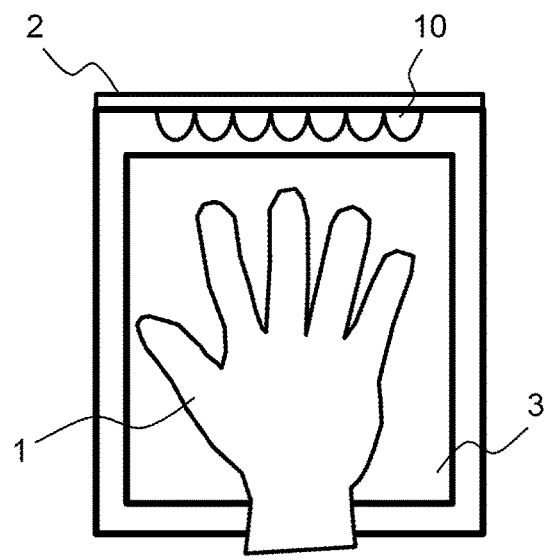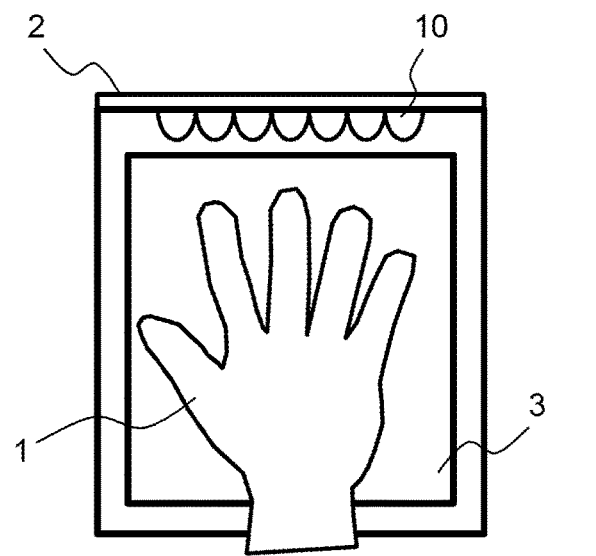
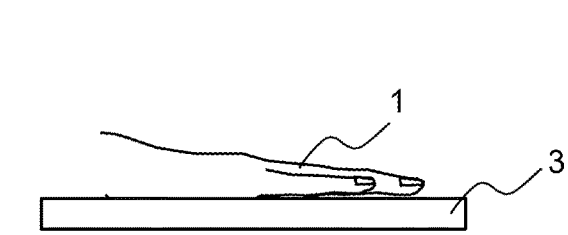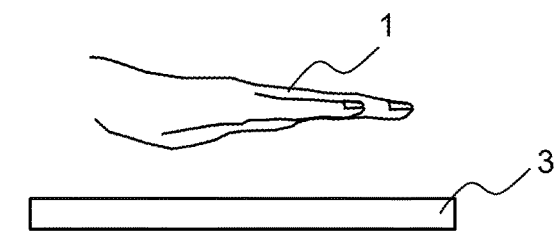
Fig. 14A                Fig. 14B
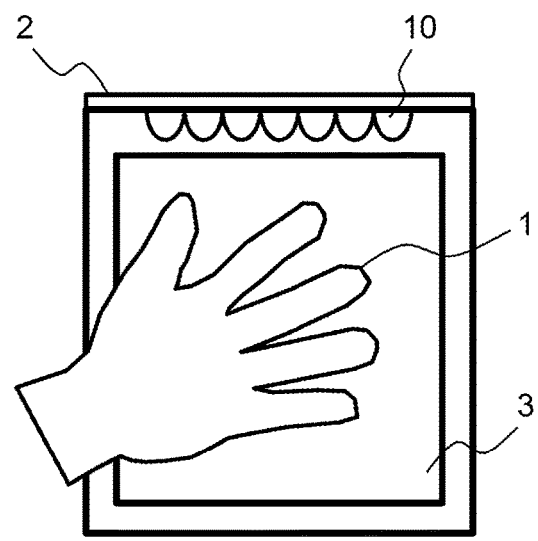
Fig. 14C

BIOMETRIC AUTHENTICATION SYSTEM

CLAIM OF PRIORITY

The present application claims priority from Japanese patent application JP 2017-252194 filed on Dec. 27, 2017, the content of which is hereby incorporated by reference into this application.

BACKGROUND OF THE INVENTION

This invention relates to a biometric authentication system configured to execute authentication with the use of biometric information of a user.

In recent years, awareness of the risk of unauthorized use of IDs, passwords, and the like is being invoked, and biometric authentication is attracting attention as personal authentication with a low risk of unauthorized use. Of various forms of biometric authentication, finger vein authentication achieves a high level of security because a vessel pattern within a finger is used.

A finger vein authentication apparatus of the related art accomplishes high precision authentication by presenting a finger at a given point on the authentication apparatus and thus increasing the reproducibility of a vein image to be photographed. However, the apparatus is touched by many and unspecified people with fingers for authentication, and accordingly has a possibility of a sanitary problem. In order to solve this problem, there has been proposed an authentication apparatus using a vein image that is obtained without a living body touching the apparatus to execute authentication. In non-contact authentication, however, the position of the finger is not fixed, and hence the finger's presentation position and posture is prone to fluctuation and the reproducibility of a vein image to be photographed is thus lowered.

The background art of this technical field includes the related art given below. In JP 2015-106386 A, for example, there is disclosed a biometric information extraction apparatus including: a biometric information acquisition unit configured to obtain verification biometric information from a living body of a user; a verification unit configured to compare the verification biometric information to registered biometric information registered in advance; a registration unit configured to register, in registration, the registered biometric information and a posture feature value of the living body in association with each other; and a classification unit configured to classify a plurality of posture feature values registered by the registration unit into one or more classes, and associate the registered biometric information registered in advance with a class to which the posture feature value associated with the registered biometric information belongs. When the verification by the verification unit succeeds, the registration unit determines the class to which the posture feature value belongs, and registers the posture feature value as a new posture feature value belonging to the determined class. When the registered biometric information associated with the determined class is not registered, the registration unit additionally registers the verification biometric information associated with the posture feature value as registered biometric information associated with the determined class.

SUMMARY OF THE INVENTION

With the technology disclosed in JP 2015-106386 A, an increase in number of classes increases the number of pieces of biometric information to be registered, which accordingly increases the number of pieces of biometric information to be verified in authentication and may lower authentication speed. In addition, with the technology disclosed in JP 2015-106386 A, the living body is presented at a fixed point, and fluctuations of the presented living body are not taken into consideration.

The representative one of inventions disclosed in this application is outlined as follows. There is provided a biometric authentication system, which is configured to execute authentication by using registered biometric information, the biometric authentication system comprising: a light source unit configured to irradiate a living body with light; an image pickup unit configured to photograph a vessel image with light radiated from the light source unit and transmitted through the living body; a control unit configured to generate authentication biometric information from the vessel image photographed by the image pickup unit; a category selection unit configured to select a category that corresponds to the authentication biometric information, based on supplementary information including information that has been obtained about a position and posture of the living body at timing of photographing the vessel image; and an authentication unit configured to execute authentication processing by comparing registered biometric information of the selected category and the authentication biometric information.

According to at least one embodiment of this invention, biometric information is verified after a category is selected, and biometric authentication high in speed and precision is therefore accomplished. Objects, configurations, and effects other than those described above are revealed in the following description of embodiments.

BRIEF DESCRIPTION OF THE DRAWINGS

FIG. 14A to FIG. 14C are diagrams for illustrating an example of fluctuations in finger presentation position and posture in the fourth embodiment.

DETAILED DESCRIPTION OF THE PREFERRED EMBODIMENTS

First Embodiment

A biometric authentication system using a vessel image of a presented living body (finger) is described in a first embodiment of this invention. In the biometric authentication system, a plurality of categories corresponding to finger positions and postures are created, vessel images registered to the categories are referred to, and registered data (a vessel image) associated with one or more categories that correspond to a detected hand position and posture is selected to execute authentication.

Figure 1:
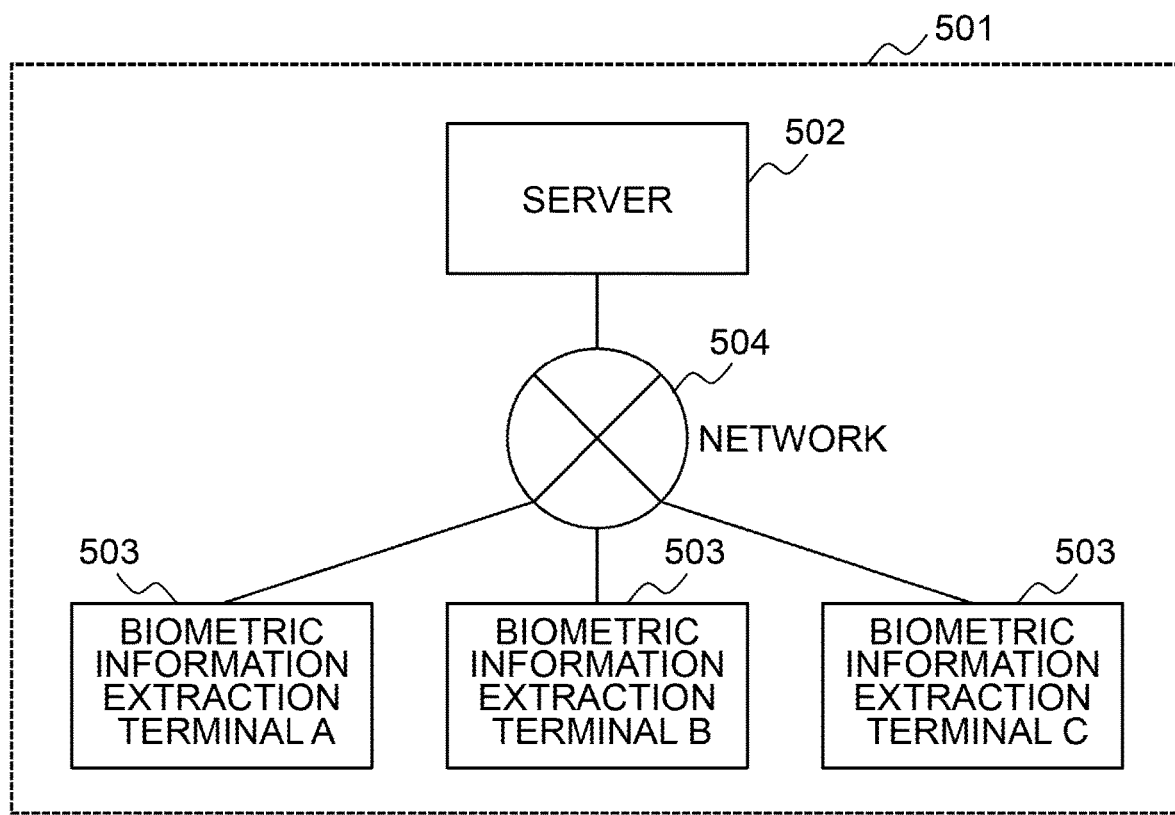
FIG. 1 is a diagram for illustrating a configuration of a biometric authentication system of a first embodiment.

FIG. 1 is a diagram for illustrating a configuration of a biometric authentication system 501 of the first embodiment.

Figure 2:
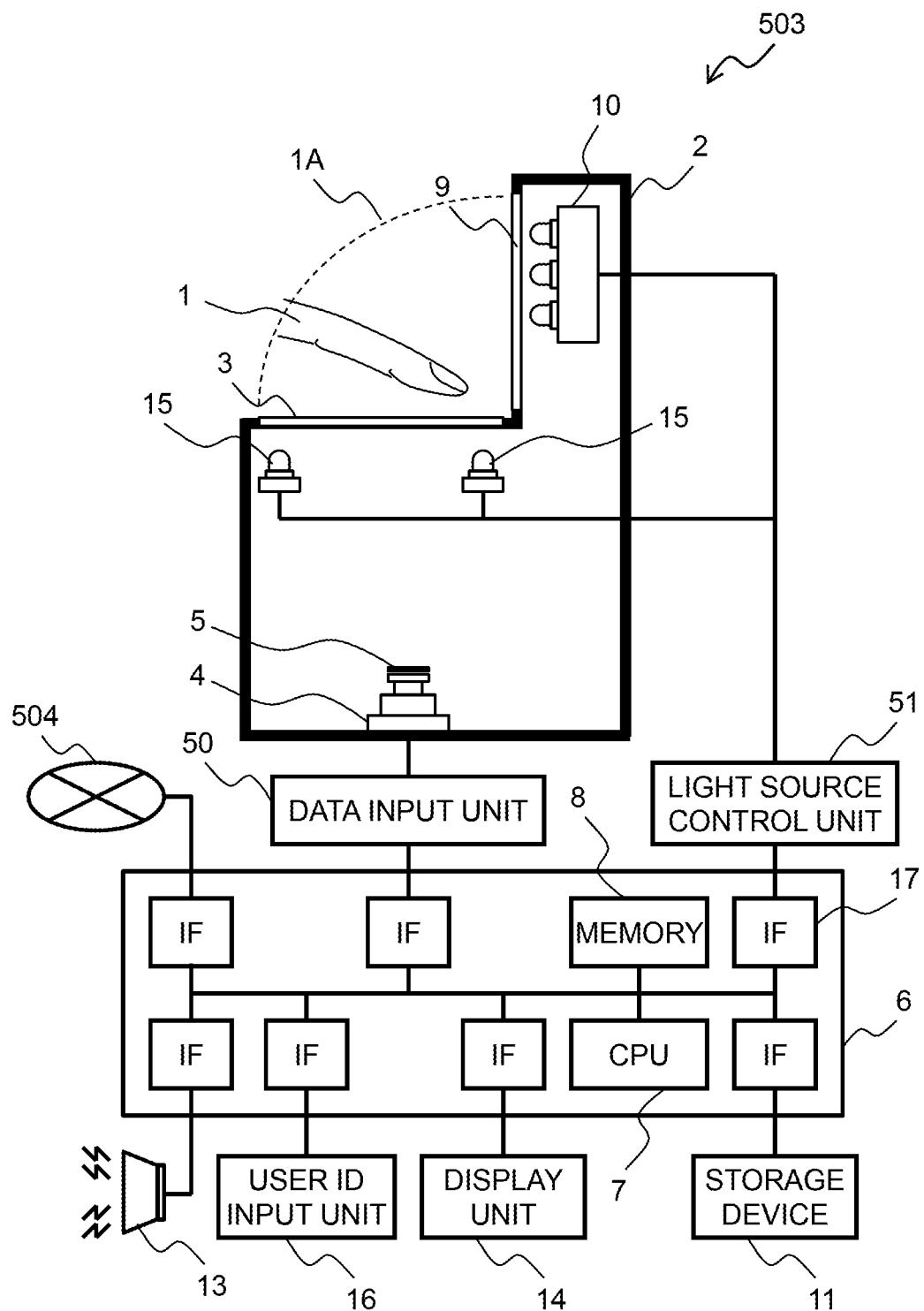
FIG. 2 is a diagram for illustrating a configuration of the biometric information extraction terminal in the first embodiment.

The biometric authentication system 501 of the first embodiment includes a server 502 (illustrated in FIG. 3) configured to execute arithmetic processing, and at least one biometric information extraction terminal 503 (illustrated in FIG. 2). The server 502 and the biometric information extraction terminal 503 are coupled to each other via a network 504.

FIG. 2 is a diagram for illustrating a configuration of the biometric information extraction terminal 503 in the first embodiment.

The biometric information extraction terminal 503 includes a vessel image photographing apparatus 2, a control unit 6, a storage apparatus 11, a speaker 13, a display unit 14, a user ID input unit 16, a data input unit 50, and a light source control unit 51.

An opening portion 3 for presenting a finger 1 to the vessel image photographing apparatus 2 when a vessel image is photographed is formed in a surface of a housing of the vessel image photographing apparatus 2. A material (for example, an acrylic resin, glass, or similar transparent material) transmissive of light (near-infrared light) radiated from a light source 10 is used for the opening portion 3. A film transmissive of near-infrared light alone may be attached to the opening portion 3 so that the interior of the vessel image photographing apparatus 2 is hard to visually recognize, which improves security.

An image pickup unit 4 is placed inside the housing below the opening portion 3, and includes an image pickup element (for example, a CMOS sensor), which receives light (near-infrared light) passed through an optical filter 5 and outputs an electric signal. Light received by the image pickup unit 4 is converted into an electric signal to be taken into the control unit 6 via the data input unit 50 as a vessel image.

An opening portion 9 is formed in an upper part of the housing surface of the vessel image photographing apparatus 2, and the light source 10 is placed inside the opening portion 9. In the vessel image photographing apparatus 2 in the first embodiment, the light source 10, the image pickup unit 4, and the finger 1 (a living body presentation area 1A) may have any positional relationship as long as the living body presentation area 1A is provided between the light source 10 and the opening portion 3 (the image pickup unit 4), and as long as the image pickup unit 4 can photograph, through the opening portion 3, the living body 1 irradiated with light from the light source 10. For example, the light source 10 may be provided to the side or below the living body 1 so that light radiated from the light source 10 through the opening portion 3 and scattered inside the living body 1 is picked up by the image pickup unit 4 through the opening portion 3.

In another example, the light source 10 is not provided and the image pickup unit 4 photographs a vessel image with a portion of illumination light or natural light irradiating the finger 1 that is transmitted through the interior of the finger 1.

Visible-light sources 15 may be provided in the opening portion 3 and emit light in different colors for different occasions, for example, when the apparatus is on standby, when a hand is detected, when authentication processing is executed, when authentication succeeds, and when authentication fails, to thereby inform a user of the state of the authentication processing.

The control unit 6 includes a CPU 7, a memory 8, and interfaces 17. The CPU 7 executes a program stored in the memory 8 to calculate, based on the vessel image taken into the control unit 6, the position of the finger 1, the posture of the finger 1, the brightness of a finger area in the vessel image, and the like. The light source control unit 51, the storage apparatus 11, the speaker 13, the display unit 14, the user ID input unit 16, the data input unit 50, and the network 504 are coupled to the interfaces 17.

The storage apparatus 11 stores data required for authentication processing. For example, when the biometric information extraction terminal 503 executes the authentication processing as described later, the storage apparatus 11 is recommended to store biometric information for verification. The speaker 13 notifies the result of authentication to the user with a sound (voice, a chime sound, or the like). The display unit 14 is a display apparatus configured to notify the user of the result of authentication in the form of text or graphics.

In authentication by the biometric information extraction terminal 503, a passcode or an ID may be input, or a magnetic card or an IC chip may be read. When the user ID input unit 16 receives a presented passcode or ID, or information on a presented magnetic card or IC chip, information to be verified can be narrowed down from a large number of pieces of registered biometric information, which improves search speed and authentication precision. Authentication precision can be improved further particularly when information to be verified can uniquely be identified and one-to-one authentication is executed.

The data input unit 50 is an interface that couples the vessel image photographing apparatus 2 to the control unit 6 to execute required data conversion.

The light source control unit 51 determines, based on the result of a calculation by the control unit 6, the light value of light to be radiated from the light source 10 placed inside the opening portion 9. The light source 10 emits light at the set light value to irradiate the finger with light. The finger vessel image taken into the control unit 6 is stored in the memory 8. The CPU 7 extracts a feature value of the biometric information from the image stored in the memory 8, and transmits the feature value to the server 502.

The biometric information extraction terminal 503 in the first embodiment uses an image photographed by the image pickup unit 4 to detect the finger position and the finger posture. However, a range sensor or similar distance detection means described later may be used to measure the distance from the finger for accurate and high-speed detection of the finger position and the finger posture.

Figures 3, 4:
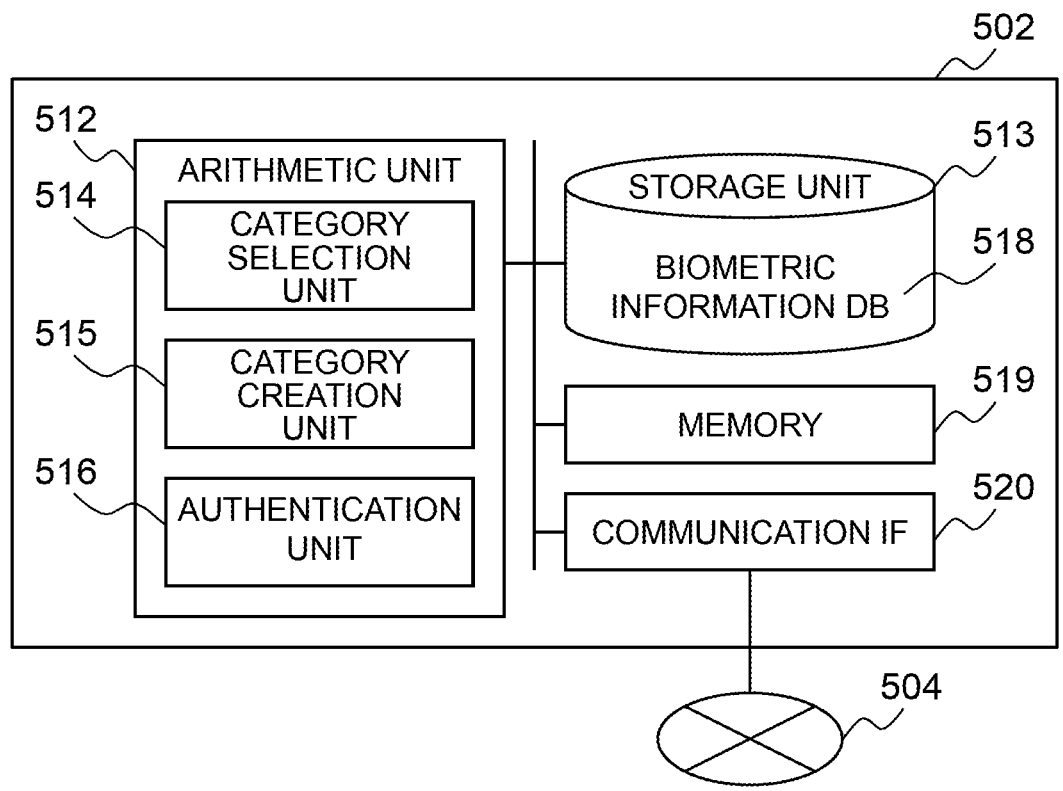
FIG. 3 is a diagram for illustrating a configuration of the server in the first embodiment.
FIG. 4 is a table for showing a configuration of the biometric information database in the first embodiment.

FIG. 3 is a diagram for illustrating a configuration of the server 502 in the first embodiment.

The server 502 executes authentication of an individual by executing a predetermined program with an arithmetic unit 512 to verify biometric information (for example, a finger vessel pattern) obtained by the biometric information extraction terminal 503. The server 502 is a computer including the arithmetic unit 512, a memory 519, a storage unit 513, and a communication interface 520.

The arithmetic unit 512 runs a program stored in the memory 519 to execute authentication processing. Specifically, the arithmetic unit 512 functions as a category selection unit 514, a category creation unit 515, and an authentication unit 516.

The category selection unit 514 selects a category corresponding to a photographed finger vessel image in authentication processing and registration processing, which are described later. The category creation unit 515 newly creates a category to which a photographed finger vessel image is registered in the registration processing described later. The authentication unit 516 compares a feature value of a photographed finger vessel image and a registered feature value in the authentication processing and the registration processing, which are described later, to execute authentication of a person presenting a finger.

The memory 519 includes a ROM, which is a non-volatile storage element, and a RAM, which is a volatile storage element. The ROM stores an unchangeable program (for example, BIOS) and others. The RAM is a dynamic random access memory (DRAM) or a similar high-speed and volatile storage element, and temporarily stores a program executed by the arithmetic unit 512 and data used when the program is executed.

The storage unit 513 is formed of a large-capacity non-volatile storage apparatus, for example, a magnetic storage apparatus (HDD) or a semiconductor storage apparatus (SSD) including a flash memory or the like, and stores a program executed by the arithmetic unit 512. In other words, the program is read out of the storage unit 513, loaded onto the memory 519, and executed by the arithmetic unit 512. The storage unit 513 stores a biometric information database 518. A configuration example of the biometric information database 518 is described later with reference to FIG. 4.

The communication interface 520 is a communication interface apparatus configured to control communication to and from another apparatus over the network 504 by following a predetermined protocol.

The server 502 may include an input interface and an output interface. The input interface is an interface to which a keyboard, a mouse, or the like is coupled to receive input from the user. The output interface is an interface to which a display apparatus, a printer, or the like is coupled to output the result of executing a program in a format visually recognizable to an operator.

A program executed by the arithmetic unit 512 is provided to the server 502 via a removable medium (a CD-ROM, a flash memory, or the like) or the network 504, and is stored in the non-volatile storage unit 513, which is a non-transitory storage medium. The server 502 is therefore recommended to include an interface for reading data from a removable medium.

The server 502 is a computer system configured on a single physical computer, or a plurality of logically or physically configured computers, and may run in a plurality of threads on the same computer or may run on a virtual computer built on a plurality of physical computer resources.

In the configurations illustrated in FIG. 1 to FIG. 3, the server 502 executes authentication processing based on information of a vessel image photographed by the biometric information extraction terminal 503. The authentication processing, however, may be executed on the biometric information extraction terminal 503 by providing an authentication unit in the biometric information extraction terminal 503.

In the biometric authentication system 501 of the first embodiment illustrated in FIG. 1, a finger vessel image is used to execute authentication of an individual, and it is therefore difficult to control the position and the posture at which a finger is presented, with the result that the position and posture of the presented finger greatly fluctuate. The fluctuations of finger position and posture in registration and in authentication cause a mismatch between a finger vessel image photographed in registration and a finger vessel image photographed in authentication, thus lowering authentication precision. As a countermeasure to the problem of a low chance of match between a vessel image in registration and a vessel image in authentication, there is an approach to improve authentication precision by registering finger vessel images that are photographed with a finger presented at various positions and postures, and executing authentication with the use of the plurality of finger vessel images photographed in registration. However, many variations to fluctuations in finger position and posture mean the use of a large number of registered images in authentication, and accordingly increase the probability of accidental authentication in which an individual is mistaken with another person (a false acceptance rate). There are also difficulties with demanding a user to present a finger at various positions and postures in registration, which lowers user-friendliness.

FIG. 4 is a table for showing a configuration of the biometric information database 518 in the first embodiment.

The biometric information database 518 is a database in which biometric information for authentication is registered, and includes a category 5181, a feature value 5182, a registration date 5183, an ID 5184, and a quality 5185.

The category 5181 indicates a category of the biometric information registered therein. The feature value 5182 indicates a feature value of the registered biometric information. The registration date 5183 indicates a year, a month, and a day on which the biometric information is registered. The registration date 5183 may include information of a time at which the biometric information is registered. The ID 5184 indicates identification information for uniquely identifying a user who has presented the biometric information. The quality 5185 indicates the quality of the registered biometric information, and is recommended to be data ranked in a plurality of stages (for example, three stages: fine, normal, and poor).

The biometric information database 518 may store, in addition to the ID 5184, personal information (the name, gender, authentication code, and the like) of the user who has presented the biometric information.

Figure 5:
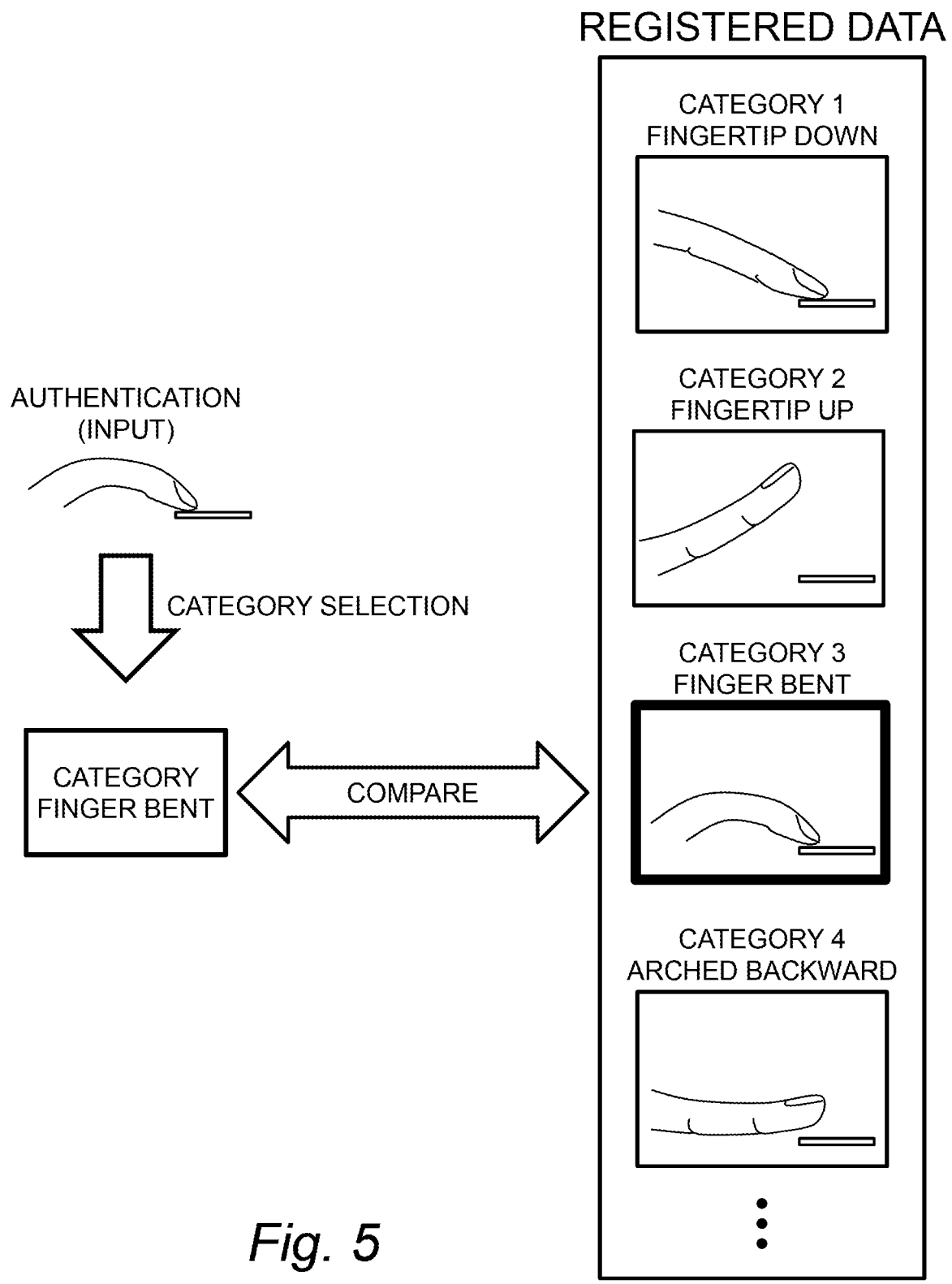
FIG. 5 is a diagram for illustrating an authentication method in the first embodiment.

FIG. 5 is a diagram for illustrating an authentication method in the first embodiment.

Categories corresponding to finger positions and postures are prepared in advance, registered data (a vessel image) that is associated with a category corresponding to the position and posture of a finger presented in authentication is selected, and the selected image is compared for authentication to a vessel image of the presented finger, to thereby accomplish high precision authentication even when the finger position and posture greatly fluctuate in authentication.

Figure 6:
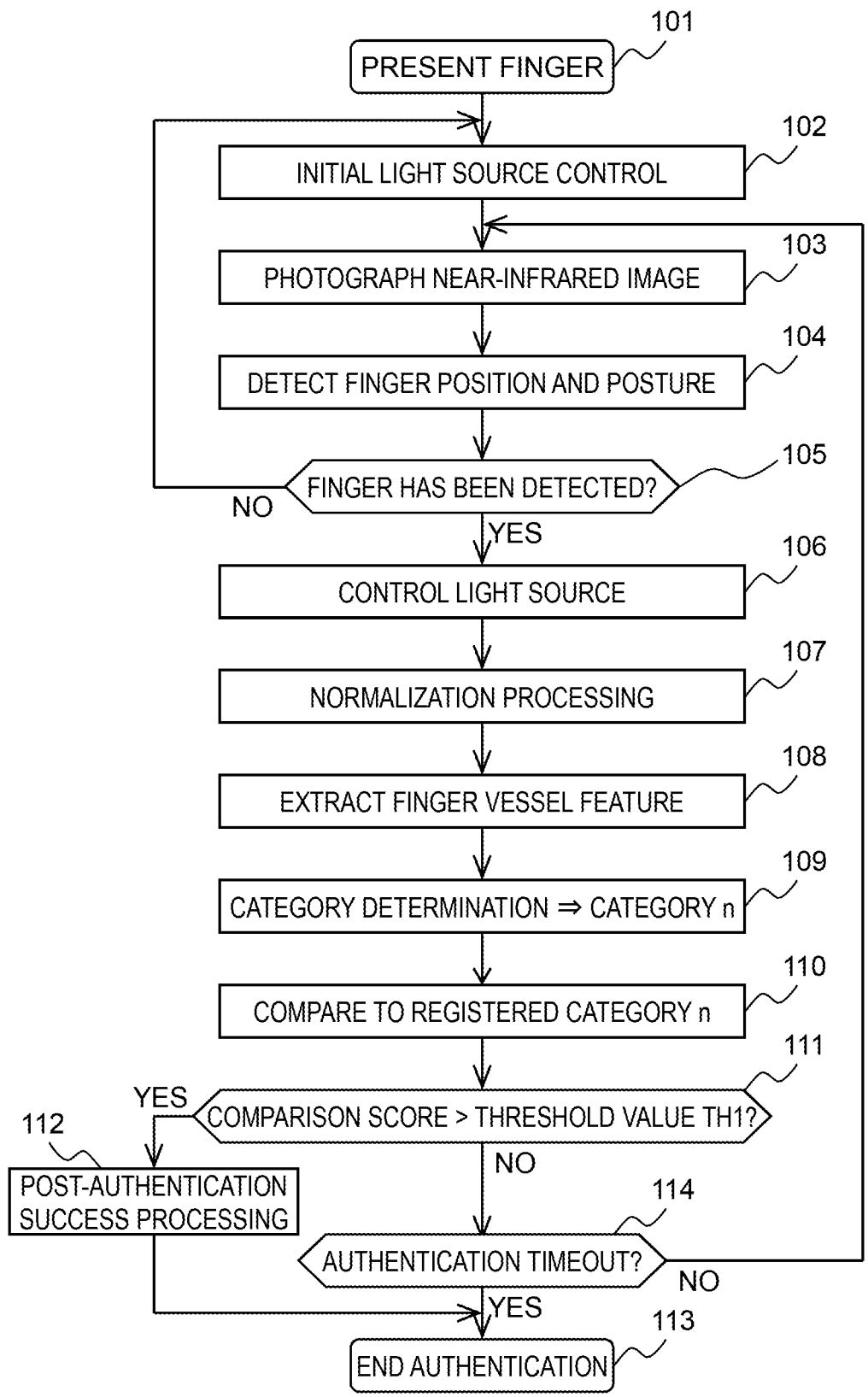
FIG. 6 is a flow chart of authentication processing in the first embodiment.

FIG. 6 is a flow chart of authentication processing in the first embodiment.

In Step S101, a person who wishes to be authenticated presents a finger in the opening portion 3. In Step S102, the control unit 6 detects the finger and determines an initial control value (light amount) of the light source 10 at which the light source 10 irradiates the finger with near-infrared light in order to photograph a vessel image.

In Step S103, the image pickup unit 4 photographs a near-infrared image of the presented finger.

In Step S104, the control unit 6 detects the position and posture of the finger with the use of the photographed near-infrared image. The finger position and posture are detectable from, for example, how and where the finger is hit with light.

In Step S105, the control unit 6 determines whether a finger has been detected. When it is determined that a finger has not been detected, the processing returns to Step S102. When it is determined that a finger has been detected, the control unit 6 determines, in Step S106, a light amount for controlling the light source 10, based on the detected finger position and posture, luminance information of the photographed finger vessel image, and other factors. The determined light amount is used in the next photographing of a near-infrared image after it is determined in Step S114 that authentication has failed, in order to photograph a sharp image of the finger's vessels.

In Step S107, the control unit 6 executes normalization processing on the photographed vessel image in order to correct the ratio of magnification and distortion due to the finger position and posture.

In Step S108, the control unit 6 extracts a feature value of the vessels from the finger vessel image processed by the normalization processing. The extracted feature value is transmitted to the server 502.

In Step S109, the category selection unit 514 of the server 502 determines a category corresponding to the detected finger position and posture, and selects one or more categories n corresponding to the detected finger position and posture. One category or a plurality of categories may be selected in Step S109 and, when an appropriate category cannot be selected, all categories may be selected.

In Step S110, the authentication unit 516 of the server 502 compares the extracted vessel feature value to a vessel feature value registered in association with the selected category, to thereby calculate a verification score. When verification data is not registered in the selected category, the extracted feature value is compared to data in categories other than the selected category.

In Step S111, the authentication unit 516 compares the calculated verification score and a predetermined threshold value TH1. When the verification score is higher than the threshold value TH1, post-authentication success processing is executed (Step S112), and the authentication processing is ended (Step S113). When the verification score is equal to or lower than the threshold value TH1, on the other hand, the server 502 determines, in Step S114, whether authentication timeout has occurred. When it is determined that a predetermined timeout time has not elapsed since the start of authentication (for example, the image photographing), the processing returns to Step S103 to newly photograph a near-infrared image and repeat the authentication processing. This photographing of a near-infrared image is executed under the condition (light amount) determined in Step S106. When it is determined that the predetermined timeout time has elapsed, on the other hand, authentication is determined as a failure and the authentication processing is ended (Step S113).

When the vessel image photographing apparatus 2 is provided with the distance detection means described later, for example, a range sensor or a range image camera, the distance detection means obtains distance information in Step S103 at the timing of near-infrared image photographing. Then, in Step S104, the control unit 6 uses the obtained distance information to detect the finger position and posture. The finger position and posture can thus be detected with high precision by using the distance information.

Figure 7:
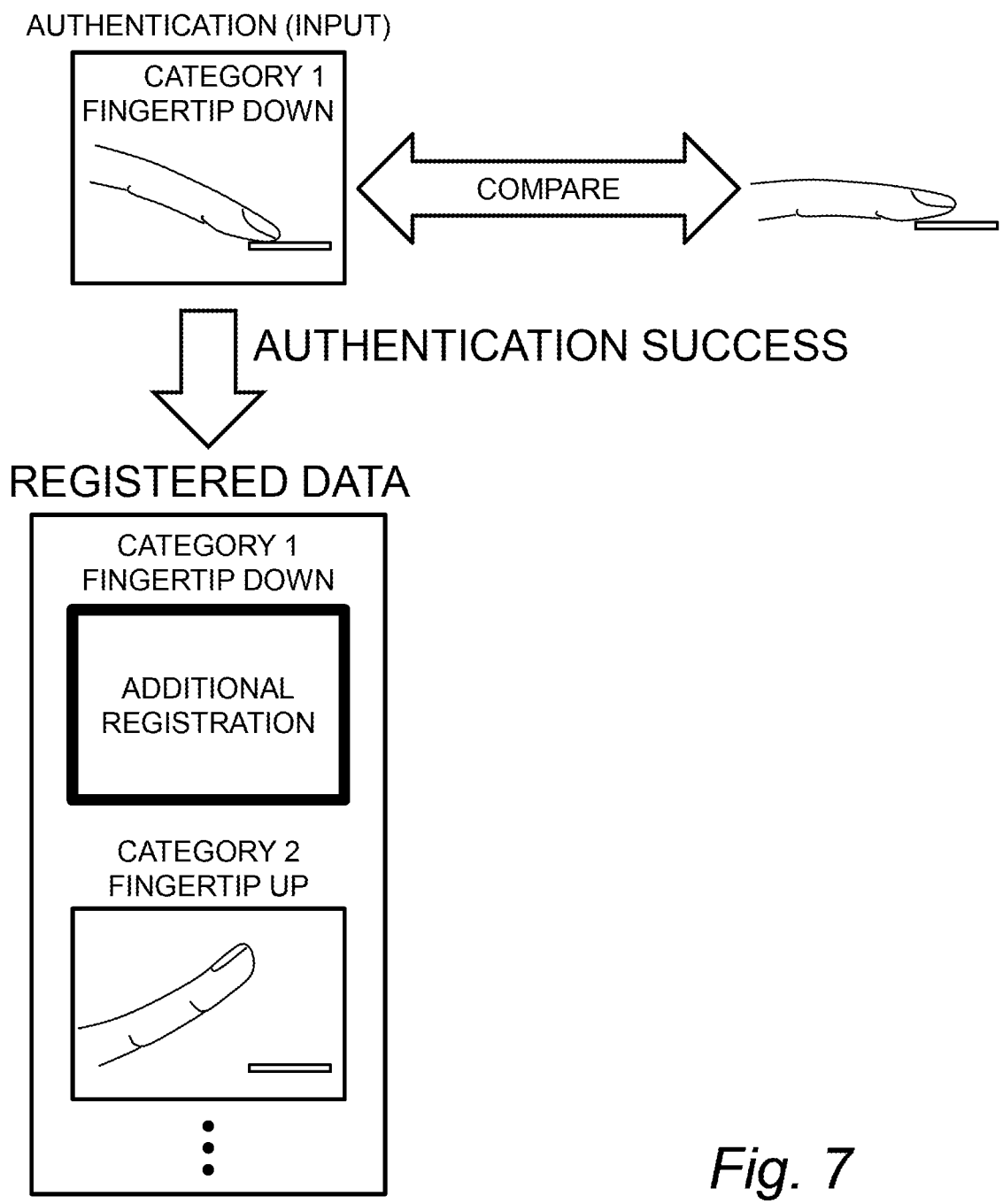
FIG. 7 is a diagram for illustrating a registration method in the first embodiment.

FIG. 7 is a diagram for illustrating a registration method in the first embodiment.

When authentication succeeds, the finger vessel image photographed in authentication is additionally registered to a category that corresponds to the finger position and posture in authentication, or a registered image is updated. Registered images associated with a plurality of categories may not be prepared when the running of the system is started, but a vessel image photographed in successful authentication is registered while the system is run. A special registration guidance for users is therefore not required, and a highly user-friendly authentication system can accordingly be achieved.

Figure 8:
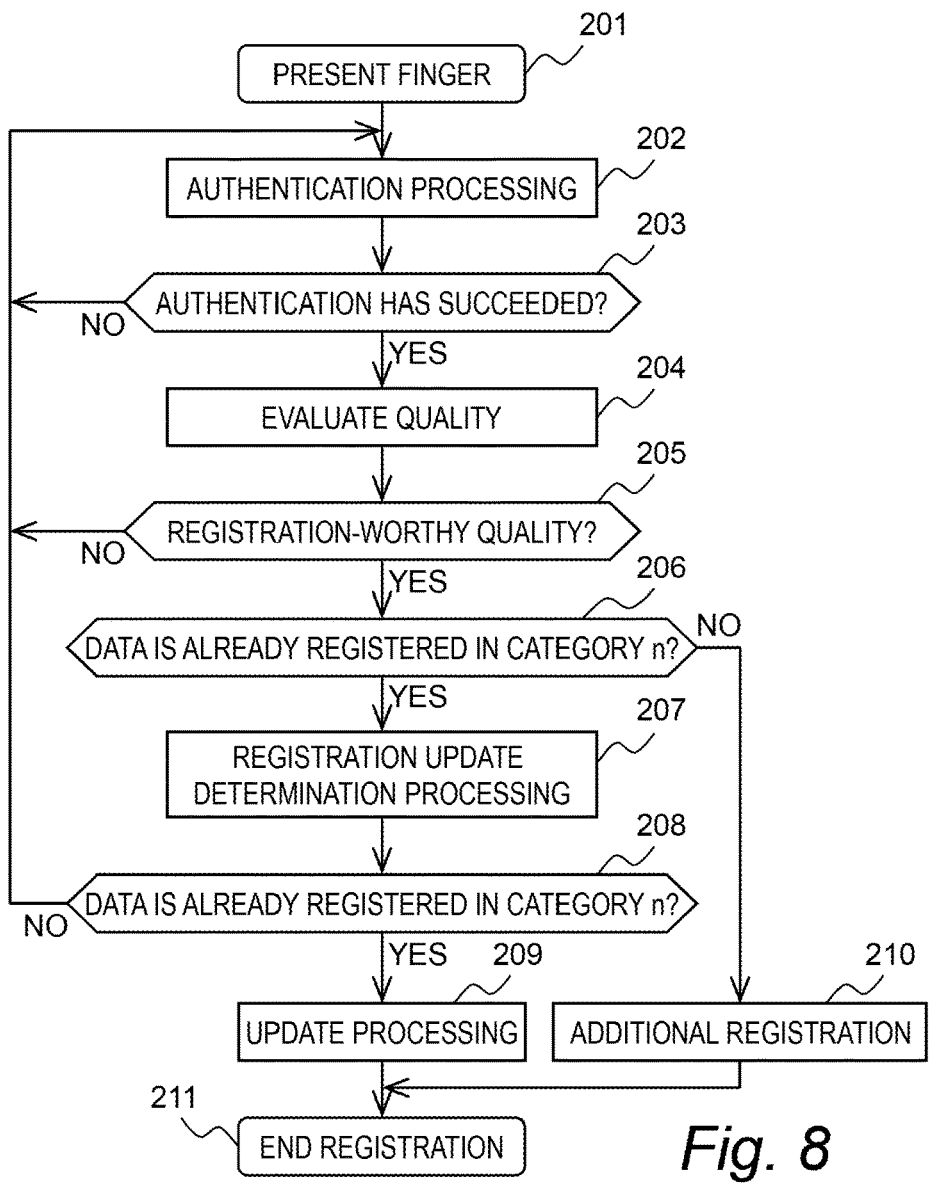
FIG. 8 is a flow chat of the registration processing in the first embodiment.

FIG. 8 is a flow chat of the registration processing in the first embodiment.

In Step S201, the user presents a finger in the opening portion 3. In Step S202, the authentication unit 516 of the server 502 executes authentication processing (for example, the authentication processing illustrated in FIG. 6).

In Step S203, the processing returns to Step S202 when it is determined that the authentication in Step S202 has failed. When it is determined that the authentication is a success, on the other hand, the authentication unit 516 determines, in Step S204, whether the vessel image photographed in the successful authentication has a registration-worthy quality, based on the vessel image obtained in the successful authentication and the position and the posture at which the finger has been presented. For example, a vessel contrast value indicating the sharpness of vessels may be calculated from the vessel image, so that, when the contrast value is equal to or higher than a predetermined threshold value, it is determined that the vessel image has a registration-worthy quality in which a sharp image of vessels is photographed. The authentication unit 516 may also determine that the vessel image has a registration-worthy quality when the quantity of vessels in the photographed vessel image is equal to or more than a predetermined threshold value. A vessel image that is not too bright and not too dark may also be determined as an image having a registration-worthy quality, based on the luminance (brightness) of the vessel image. The result of the authentication processing (the degree of similarity to data of a person whom the user claims to be, or the degree of similarity to data of another person) in Step S202 may be used to determine that a vessel image low in false acceptance rate and low in false rejection rate has a registration-worthy quality. The plurality of conditions described above may be used in combination for the determination as well.

In Step S205, the processing proceeds to Step S206 when the vessel image is evaluated in Step S204 as having a registration-worthy quality, and the processing returns to Step S202 when the quality is not registration-worthy.

In Step S206, the category creation unit 515 of the server 502 determines whether data is already registered in the category n corresponding to the finger position and posture in the successful authentication of the authenticated person.

The processing proceeds to Step S207 when data is already registered in the category n. When data is not registered yet in the category n, the category creation unit 515 of the server 502 additionally registers the vessel image in the successful authentication to registered data of the category n (Step S210), and the registration processing is ended (Step S211).

In Step S207, the category creation unit 515 compares the feature value of a vessel image already registered in the category n and the feature value of the vessel image photographed in the successful authentication to determine whether to update registration. Specifically, when the category n does not have a vessel image registered therein, the feature value of the photographed vessel image is registered. When the quality of the photographed vessel image is higher than the quality of the vessel image registered in the category n, the feature value of the photographed vessel image is registered to update the registered data. In this manner, the registered data is updated so that the seasonality of the living body (for example, the expansion or contraction of finger vessels due to a temperature change) is reflected, and high precision authentication is consequently accomplished.

In Step S208, the processing returns to Step S202 when the result of the determination of Step S207 is "not to update". When the result of the determination of Step S207 is "to update", on the other hand, the category creation unit 515 updates, in Step S209, the registered data with the vessel image photographed in the successful authentication, and the registration processing is ended in Step S211.

As described above, according to the biometric authentication system of the first embodiment, the category selection unit 514 selects a category corresponding to authentication biometric information, based on supplementary information including information that has been obtained about the position and posture of a living body at the timing of photographing a vessel image, and the authentication unit 516 compares registered biometric information of the selected category and the authentication biometric information to execute authentication processing. The biometric authentication system of the first embodiment is therefore capable of authentication high in reliability and speed.

The authentication biometric information is recorded in the biometric information database 518 in association with a category corresponding to the authentication biometric information. This facilitates category selection and helps to verify biometric information at high speed.

Unlike the known background art in which the presented living body is a hand, the living body in the first embodiment is a finger, and the smallness of the living body leads to great fluctuations in position as well as fluctuations in posture. In addition, a hand has a flat shape and is accordingly easy to present horizontally, whereas a finger, having a cylindrical shape, is presented while being rotated about the longitudinal direction of the finger in some cases. For that reason, the first embodiment takes posture fluctuations in addition to position fluctuations into consideration in selecting a category in authentication in which a finger is presented in a contactless manner, to thereby accomplish authentication with precision higher than in the related art.

Second Embodiment

In a configuration described in a second embodiment of this invention, biometric information registered in a category that is selected from a plurality of categories is used for authentication as in the first embodiment and, when the position and the posture at which a living body is presented can be restricted in actual operation, high precision authentication is accomplished.

In the description of the second embodiment, components and processing (functions) that are the same as those in the first embodiment described above are denoted by the same reference symbols, and descriptions thereof are omitted.

Figure 9:
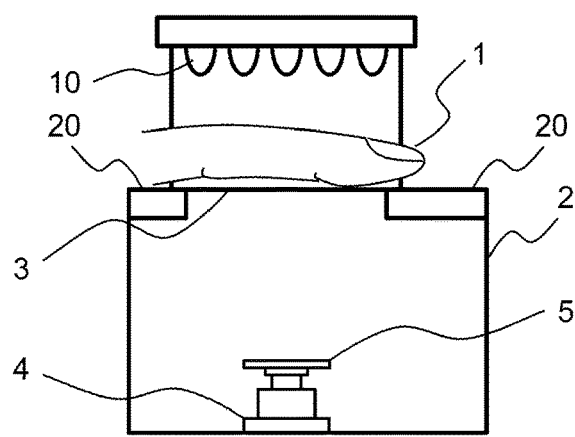
FIG. 9 is a diagram for illustrating a configuration of the vessel image photographing apparatus in a second embodiment.

FIG. 9 is a diagram for illustrating a configuration of the vessel image photographing apparatus 2 in the second embodiment.

In the vessel image photographing apparatus 2 in the second embodiment, a finger presentation portion 20, on which the user presents the finger 1, is provided in the opening portion 3, and the user presents a finger in authentication and registration in contact with the finger presentation portion 20 so that the position and posture of the finger can be restricted. It can accordingly be expected in actual operation that most users present a finger at the same position (a basic position) and the same posture (a basic posture). However, as the number of times the vessel image photographing apparatus 2 is used increases, the frequency of finger presentation at a position and posture deviated from the basic position and the basic posture increases, and authentication fails at an increased frequency. To address this, a vessel feature of a finger vessel image that is obtained by photographing a finger presented at the basic position and basic posture is registered in the storage apparatus 11 as basic registered data, and a plurality of categories are created so as to correspond to finger vessel images in each of which at least one of the presentation position and the presentation posture is deviated from the basic position or the basic posture.

In authentication, a vessel feature extracted from a vessel image of a finger presented by the user is compared to the basic registered data, the extracted vessel feature is further compared to registered data of a category corresponding to the position and posture of the presented finger, and the results of comparison to a plurality of pieces of registered data are summed up. High precision authentication is thus accomplished even when a finger is presented at a position and posture deviated from the basic position and the basic posture. In the second embodiment, comparison is executed twice: comparison to the basic registered data and comparison to registered data of a category corresponding to the finger position and posture in authentication, and high precision authentication is accordingly accomplished with fewer times of comparison than when comparison to registered data of all categories is executed.

In the second embodiment, comparison to registered data of a category corresponding to the finger position and posture in authentication alone may be executed as in the first embodiment.

Figure 10:
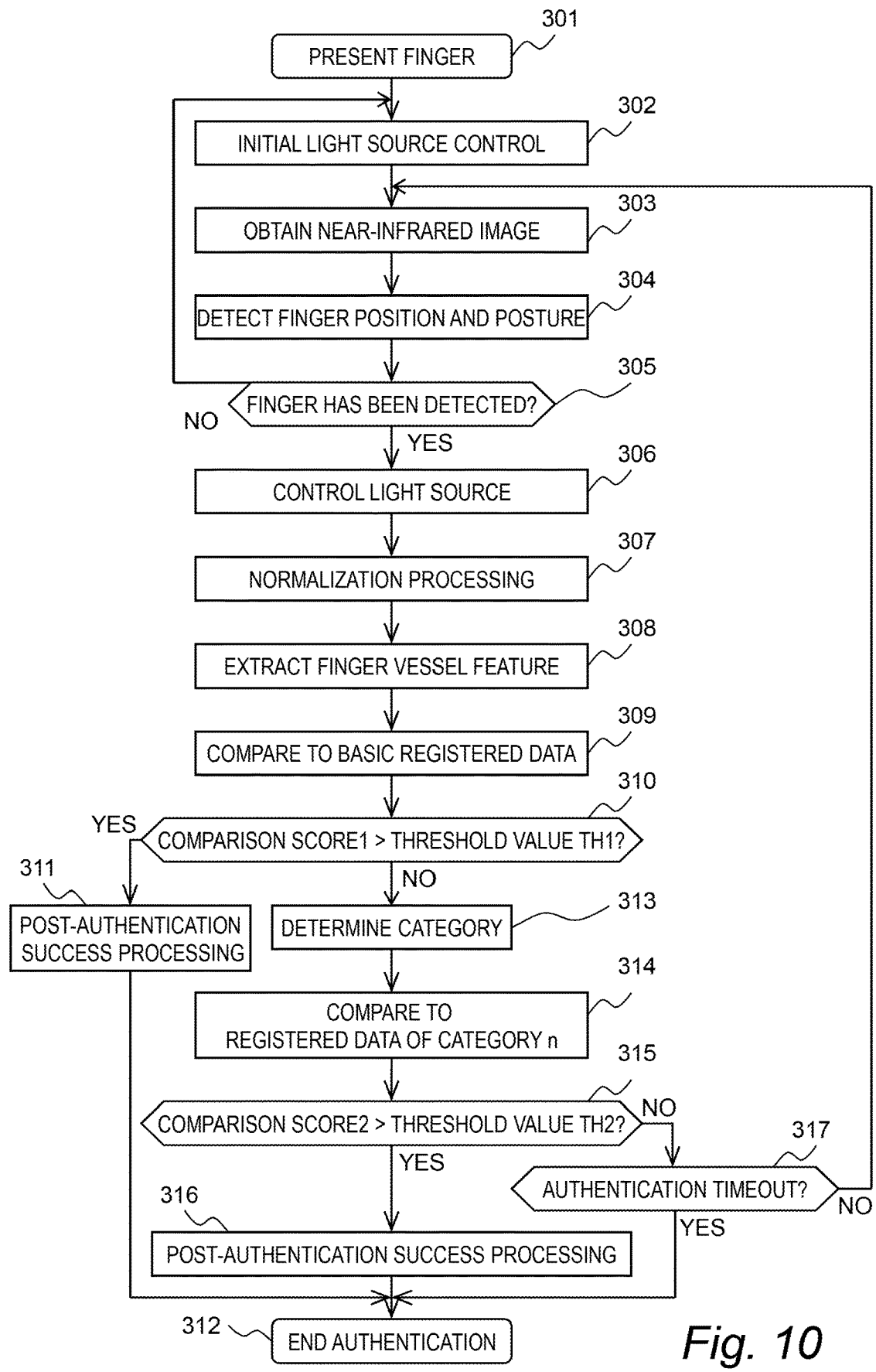
FIG. 10 is a flow chart of authentication processing in the second embodiment.

FIG. 10 is a flow chart of authentication processing in the second embodiment.

In Step S301, a person who wishes to be authenticated presents a finger in the opening portion 3. In Step S302, the control unit 6 detects the finger and determines an initial control value (light amount) of the light source 10 at which the light source 10 irradiates the finger with near-infrared light in order to photograph a vessel image.

In Step S303, the image pickup unit 4 photographs a near-infrared image of the presented finger.

In Step S304, the control unit 6 detects the position and posture of the finger with the use of the photographed near-infrared image.

In Step S305, the control unit 6 determines whether a finger has been detected. When it is determined that a finger has not been detected, the processing returns to Step S302. When it is determined that a finger has been detected, the control unit 6 determines, in Step S306, a light amount for controlling the light source 10, based on the detected finger position and posture, luminance information of the photographed finger vessel image, and other factors. The determined light amount is used in the next photographing of a near-infrared image after it is determined in Step S317 that authentication timeout has occurred, in order to photograph a sharp image of the finger's vessels.

In Step S307, the control unit 6 executes normalization processing on the photographed vessel image in order to correct the ratio of magnification and distortion due to the finger position and posture.

In Step S308, the control unit 6 extracts a feature value of the vessels from the finger vessel image processed by the normalization processing. The extracted feature value is transmitted to the server 502.

In Step S309, the authentication unit 516 of the server 502 compares the extracted vessel feature to the basic registered data, which is a vessel feature of a finger vessel image photographed with a finger presented at the basic position and the basic posture, to calculate a verification score 1.

In Step S310, the authentication unit 516 compares the calculated verification score 1 and a predetermined threshold value TH1. When the verification score is higher than the threshold value TH1, post-authentication success processing is executed (Step S311), and the authentication processing is ended (Step S312). When the verification score is equal to or lower than the threshold value TH1, on the other hand, the category selection unit 514 of the server 502 determines, in Step S313, a category corresponding to the detected finger position and posture, and selects the category n corresponding to the detected finger position and posture.

In Step S314, the authentication unit 516 compares a vessel feature registered in the selected category n and the vessel feature extracted in Step S308 to calculate a verification score 2.

In Step S315, the authentication unit 516 compares the calculated verification score 2 and a predetermined threshold value TH2. When the verification score is higher than the threshold value TH2, post-authentication success processing is executed (Step S316) and the authentication processing is ended (Step S312). When the verification score is equal to or lower than the threshold value TH2, on the other hand, the server 502 determines, in Step S317, whether authentication timeout has occurred. When it is determined that a predetermined timeout time has not elapsed since the start of authentication (for example, the image photographing), the processing returns to Step S303 to newly photograph a near-infrared image and repeat the authentication processing. This photographing of a near-infrared image is executed under the condition (light amount) determined in Step S306. When it is determined that the predetermined timeout time has elapsed, on the other hand, authentication is determined as a failure and the authentication processing is ended (Step S312).

Figure 11:
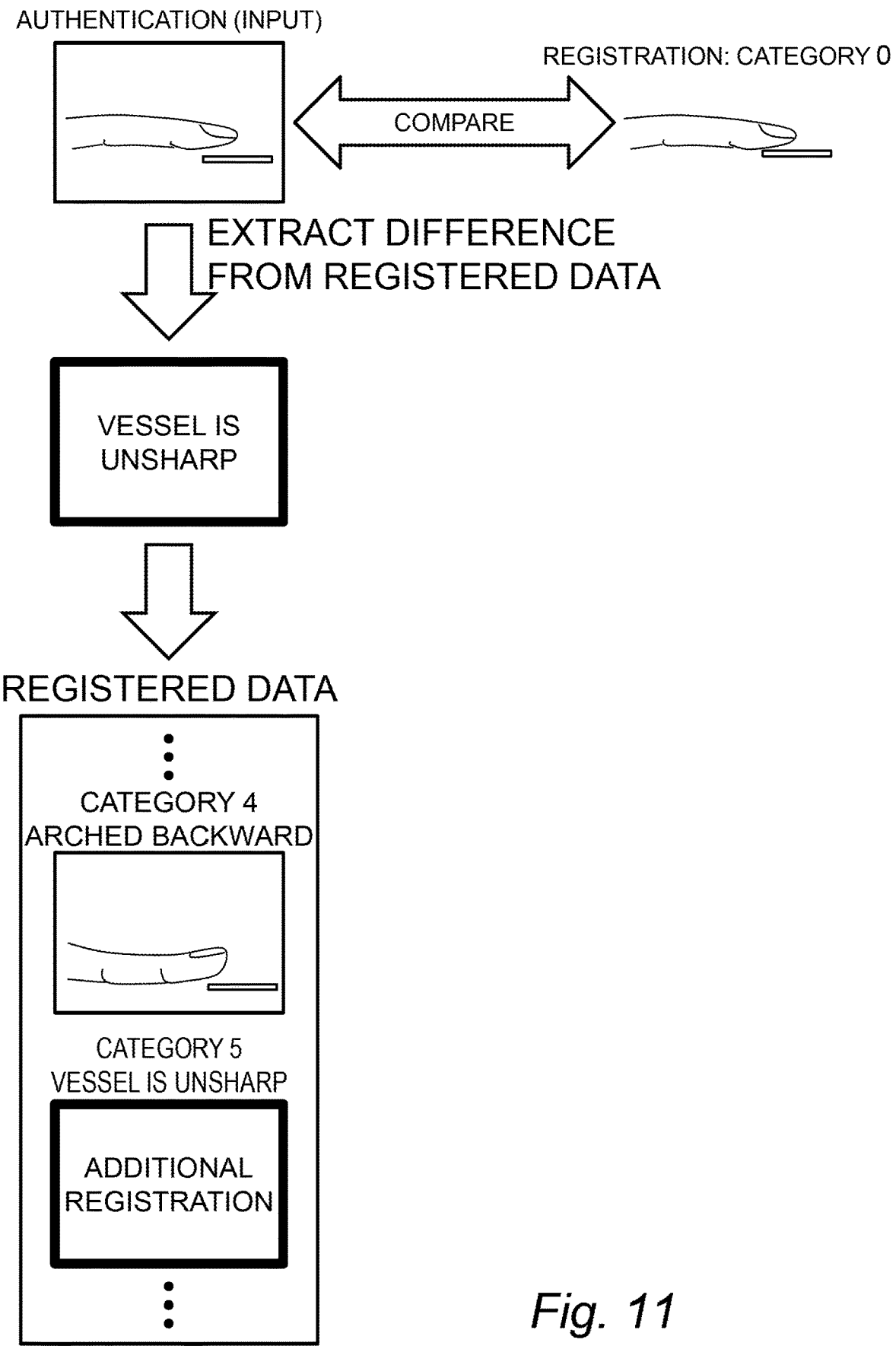
FIG. 11 is a diagram for illustrating a categorization method based on information other than finger position and posture in the second embodiment.

A modification example of the categories in which categorization criteria are other than finger position and posture is described next. FIG. 11 is a diagram for illustrating a categorization method based on information other than finger position and posture.

Categorization in the example described above is based on the position and posture of the presented finger. However, even without fluctuations in finger position and posture, a vessel image is sometimes sharp and other times unsharp due to vessel expansion and contraction, which increases the difference between a vessel image in registration and a vessel image in authentication, and the increased difference may lower authentication precision. To address this, when a photographed finger vessel image to be registered to a category corresponding to the finger position and posture in authentication has a low degree of match to the basic registered data and registered data of a category corresponding to the position and the posture, the finger vessel image photographed in authentication is sorted into another category, which is a category for unsharp vessel images, as illustrated in FIG. 11, and is registered as registered data of this category. In authentication, when the degree of match to the basic registered data or registered data of a category based on position and posture is low, comparison to registered data of the category for unsharp vessel images is executed, to thereby accomplish high precision authentication in the case where finger position and posture do not fluctuate and the sharpness of a vessel image greatly fluctuates.

Processing of determining a category based on the result of comparison to registered data, and executing authentication by comparison to registered data (biometric information) of the determined category may be the same as the one in the flow chart of FIG. 10. In the second embodiment, the category determination in Step S313 of the flow chart of FIG. 10 can be based on fluctuations of biometric information, for example, a difference in vessel quantity of the finger vessel image that is calculated by comparison to the basic registered data in Step S309. When the category determination is based on the vessel quantity of the vessel image in authentication in addition to the difference in vessel quantity between the vessel image in registration and the vessel image in authentication, high precision authentication is accomplished even when fluctuations in vessel quantity are large.

As described above, according to the biometric authentication system of the second embodiment, the category selection unit 514 selects a category corresponding to authentication biometric information based on information about the position and posture of a living body and information about the sharpness of a vessel image. The biometric authentication system of the second embodiment is therefore capable of dealing with fluctuations of a living body due to long-term use, and can keep up with, for example, conditions of the living body and seasonal factors.

Third Embodiment

In the first embodiment and the second embodiment, a category to which biometric information is to be registered is selected from a plurality of existing categories. In a configuration described in a third embodiment of this invention, biometric information is registered to a category that is newly created when authentication succeeds, based on variations to the position, posture, and the like of a user's finger held above a biometric authentication system, to thereby accomplish high precision authentication.

Authentication processing in the third embodiment may be the same as the processing described in the first embodiment with reference to the flow chart of FIG. 6 and the processing described in the second embodiment with reference to the flow chart of FIG. 10.

In the third embodiment, a category to which biometric information is to be registered is not required to be set in advance, and registered data other than data for initial registration is not required to be prepared. When authentication succeeds, a new category is created based on a difference between the finger position and posture in authentication and the finger position and posture in registration, and a vessel feature in the successful authentication is registered to a category corresponding to the finger position and posture in authentication. As in the second embodiment, a new category may be created based on a difference in sharpness between a vessel image in authentication and a vessel image in registration.

When there is bias to the position and posture of a presented living body due to a trend in how a user presents a living body or a difference of environment in which an authentication apparatus is installed, categories corresponding to the bias to the position and posture of the living body are generated. High precision authentication adapted to the user's inclination or the environment in which the authentication apparatus is installed is consequently accomplished.

Figure 12:
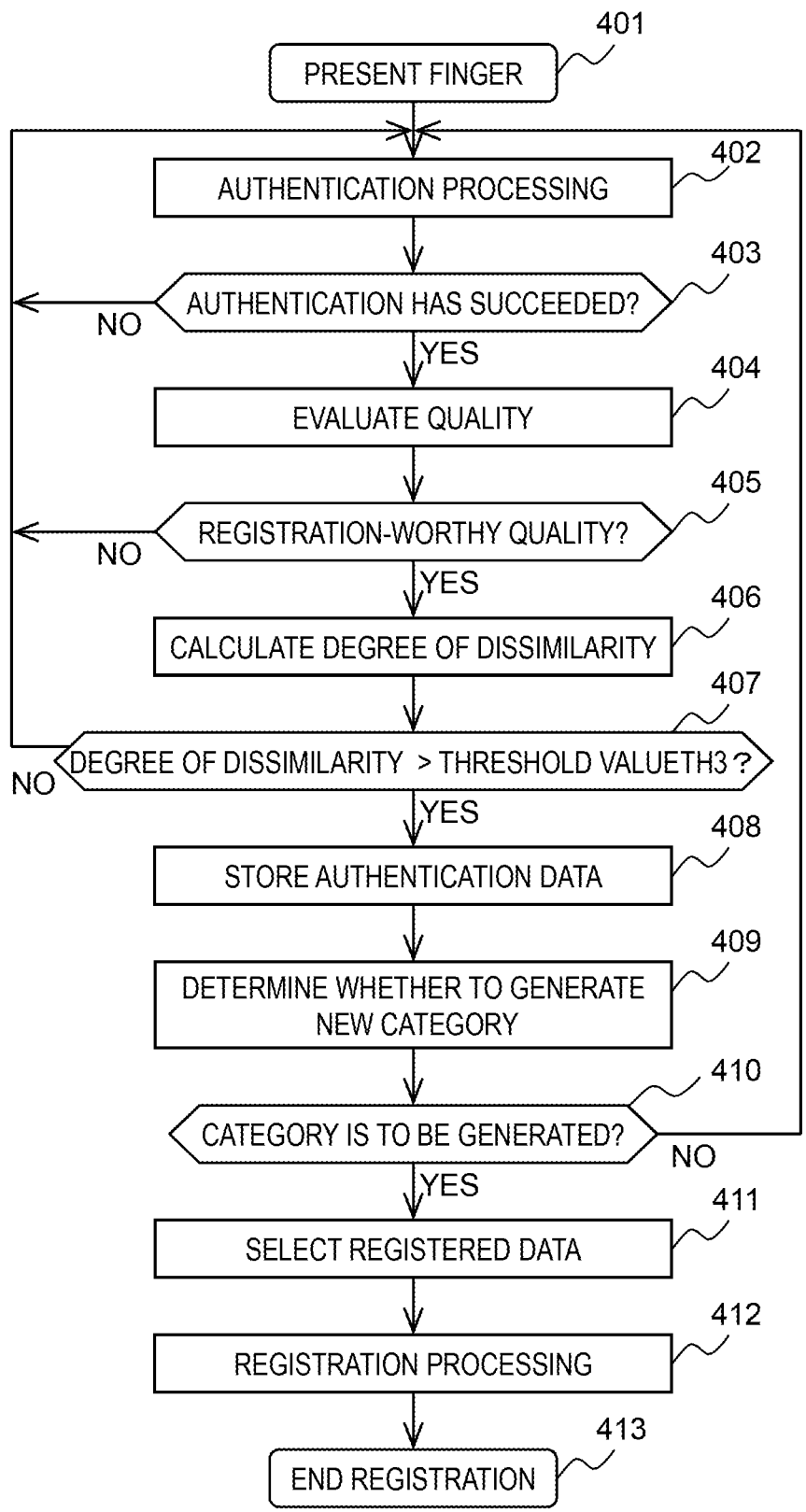
FIG. 12 is a flow chat of the registration processing in a third embodiment.

FIG. 12 is a flow chat of the registration processing in the third embodiment.

In Step S401, the user presents a finger in the opening portion 3. In Step S402, the authentication unit 516 of the server 502 executes authentication processing (for example, the authentication processing illustrated in FIG. 6 and FIG. 10).

In Step S403, the processing returns to Step S402 when it is determined that the authentication in Step S402 has failed. When it is determined that the authentication is a success, on the other hand, the authentication unit 516 determines, in Step S404, whether the vessel image photographed in the successful authentication has a registration-worthy quality, based on the vessel image obtained in the successful authentication and the position and the posture at which the finger has been presented. For example, a vessel contrast value indicating the sharpness of photographed vessels is calculated from the vessel image, and whether the quality is high enough as a registered image used for authentication is determined in terms of the sharpness of the photographed vessels. The quality determination may be based on the luminance (brightness) of the vessel image.

In Step S405, the processing proceeds to Step S406 when the vessel image is evaluated in Step S404 as having a registration-worthy quality, and the processing returns to Step S402 when the quality is not registration-worthy.

In Step S406, the category creation unit 515 of the server 502 calculates the degree of dissimilarity between the vessel image photographed in the successful authentication and a vessel image registered in a category that has already been defined in the authentication processing of Step S402. The calculation may be based on, for example, a difference between a position and a posture at which the finger is presented in the successful authentication and a position and a posture at which the finger is presented in registration. The result of authentication may also be used to calculate the degree of dissimilarity between the vessel images. For example, when a value used in the authentication that is determined as a success is close to the threshold value, it is better to register the vessel image of the finger presented in authentication to another category.

In Step S407, the category creation unit 515 compares the degree of dissimilarity calculated in Step S406 with a predetermined threshold value. When the degree of dissimilarity is equal to or lower than the threshold value TH3, the processing returns to Step S402. When the calculated degree of dissimilarity is higher than the threshold value TH3, on the other hand, the vessel image in authentication is stored, in Step S408, in the storage apparatus 11 as a candidate for an image to be registered to a new category.

In Step S409, the category creation unit 515 determines whether to generate a new category. When the degree of similarity is high among vessel images of the fingers presented in a plurality of authentication sessions, a vessels image of the fingers presented by the user tends to be the vessel image photographed in authentication. A new category is therefore generated when the degree of similarity is high among a plurality of vessel images that are images of vessels presented by the user and are stored in the storage apparatus 11. The condition for generating a new category may be the number of vessel images stored in the storage apparatus 11 that have a high degree of similarity. For instance, a new category may be generated when a predetermined number of vessel images having a predetermined degree of similarity are stored in the storage apparatus 11.

In Step S410, the processing returns to Step S402 when it is determined in Step S409 that a category is not to be generated. When it is determined that a category is to be generated, on the other hand, the category creation unit 515 selects, in Step S411, an image that represents a newly generated category as additional registered data, from a plurality of vessel images stored in the storage apparatus 11 as candidates for an image to be registered to a new category. For example, an image having a quality score that is high among the registration candidate vessel images may be selected as the representative image. To give another example, the degree of similarity among the plurality of registration candidate vessel images may be calculated to select an image having a high degree of similarity to other candidate images (an image at the center of the range of similarity) as the representative image.

In Step S412, the category creation unit 515 registers the vessel image selected in Step S411 to the new category generated in Step S409. In Step S413, the registration processing is ended.

In registration, in addition to the generation of a new category and the registration of authenticated biometric information, additional registration of authenticated biometric information to an existing category and an update of registered biometric information may be executed as in the first embodiment.

As described above, according to the biometric authentication system of the third embodiment, the category creation unit 515 generates a category corresponding to obtained supplementary information when it is found out as a result of the comparison by the authentication unit that the degree of similarity between registered biometric information and authentication biometric information is higher than a predetermined value. The biometric authentication system can therefore be run with high precision without researching a user's inclination or bias in advance. The system also learns the user's inclination or bias, and can accordingly be managed with less trouble.

Fourth Embodiment

In a configuration described in a fourth embodiment of this invention, comparison to biometric information that is registered in a category selected from a plurality of categories is executed for authentication as in the first embodiment, and finger vessel authentication in which a plurality of fingers are presented at the same time is performed with high precision. Components and functions in a biometric authentication system according to the fourth embodiment that are the same as those in the embodiments described above are denoted by the same reference symbols, and descriptions thereof are omitted. Features of any one of the first embodiment to the third embodiment may be applied to the fourth embodiment.

Figure 13:
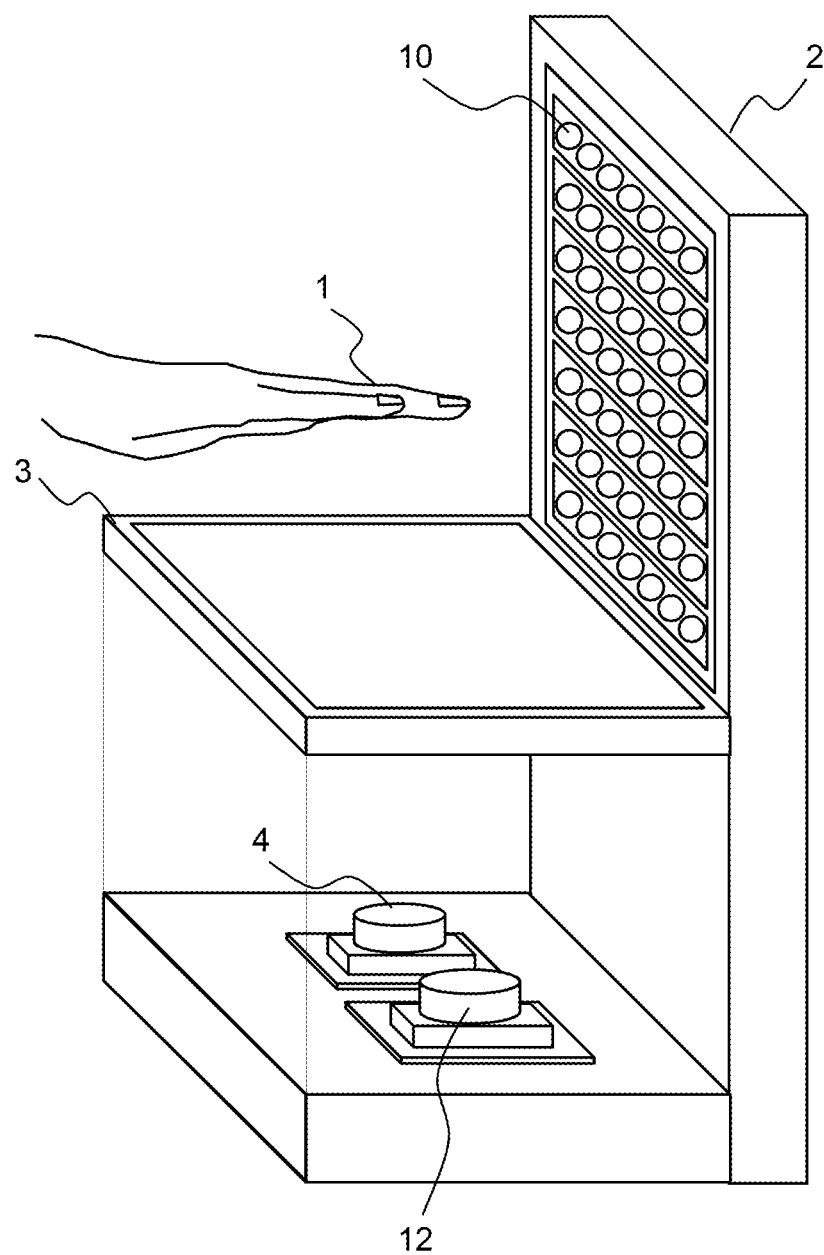
FIG. 13 is a diagram for illustrating an example of the vessel image photographing apparatus configured to photograph a vessel image of a plurality of fingers presented at the same time in a fourth embodiment.

FIG. 13 is a diagram for illustrating an example of the vessel image photographing apparatus 2 configured to photograph a vessel image of a plurality of fingers presented at the same time. In the vessel image photographing apparatus 2, the CPU 7 executes a program stored in the memory 8 and, when a plurality of fingers (a hand) 1 are presented above the opening portion 3, controls the light source 10 so that the plurality of presented fingers are irradiated with near-infrared light in order to photograph a vessel image of the plurality of fingers. The light irradiating the fingers and scattered is received by the image pickup unit 4 placed below the opening portion 3, and the image pickup unit 4 photographs the vessel image. The photographed vessel image is taken into the control unit 6 and is stored in the memory 8. The CPU 7 compares a feature of the image stored in the memory 8 and a feature of an image stored in advance in the storage apparatus 11 to execute authentication. A range sensor 12 is provided in the vicinity of the image pickup unit 4. The range sensor 12 is, for example, a range image camera, and photographs a range image containing information about the distance to the presented hand. With the range sensor 12, the position and posture of the plurality of presented fingers 1 can accurately be detected.

The vessel image photographing apparatus 2 illustrated in FIG. 13 has a high degree of freedom in the position and posture of presented fingers, and it is expected that fingers are presented at various positions and postures when the vessel image photographing apparatus 2 is used by a large number of people. Many variations to the position and posture of a presented hand, namely, a large difference between hand position and posture in registration and finger position and posture in authentication, lowers authentication precision. For that reason, high precision authentication is accomplished in the same manner as in the first embodiment, by registering vessel images to a plurality of categories that are created based on finger position and posture, selecting registered data of a category corresponding to the position and the posture at which fingers are presented in authentication, and comparing a feature of the photographed vessel image to the selected registered data. The categories corresponding to finger positions and postures are created so that a difference between one category and another category is large, to thereby accomplish high precision authentication even when there are large variations to the position and posture of presented fingers.

FIG. 14A to FIG. 14C are diagrams for illustrating an example of fluctuations in finger presentation position and posture in the vessel image photographing apparatus 2 illustrated in FIG. 13.

FIG. 14A is a diagram for illustrating an example of a recommended position and posture at which fingers are recommended to be presented in registration, and the palm of a hand is laid on the opening portion 3 (a transparent member forming the opening portion 3) in the example. A category corresponding to the position (basic position) and the posture (basic posture) at which fingers are recommended to be presented is defined as a basic category.

The vessel image photographing apparatus 2 illustrated in FIG. 13 is capable of authentication both in a state in which fingers are in contact with the apparatus and in a non-contact state in which fingers are held apart from the apparatus. A finger vessel image obtained at the basic posture and in the non-contact state as illustrated in FIG. 14B is therefore recommended to be used to create a category.

The vessel image photographing apparatus 2 illustrated in FIG. 13 does not restrict the position at which fingertips are presented. Consequently, fingers are sometimes presented with the hand rotated on the plane of the opening portion 3. A finger vessel image obtained with the hand rotated as illustrated in FIG. 14C is therefore recommended to be used to create a category.

A finger vessel image photographed at a fingertip down posture and a finger vessel image photographed at a fingertip up posture as illustrated in FIG. 5 are also recommended to be used to create categories. Finger vessel images photographed at a finger bent posture, a finger arched backward posture, and other finger postures may also be used to create categories.

A category for a combination of a plurality of finger positions and postures may be created. For example, a category for a combination of the non-contact state (illustrated in FIG. 14B) and the hand rotated state (illustrated in FIG. 14C) may be created.

The position and the posture may be determined for each presented finger so that categories corresponding to the positions and postures of the respective fingers are selected for comparison to registered data.

A description is given on an example of registration processing in a finger vessel authentication apparatus that uses the vessel image photographing apparatus 2 illustrated in FIG. 13, to which a plurality of fingers are presented. In registration, a finger vessel image is photographed with fingers held in contact with the transparent member, which forms the opening portion 3, in order to stably obtain a sharp finger vessel image. When fingers are presented in a non-contact state in registration by holding the fingers apart from the opening portion 3, the distance between the fingers and the opening portion 3 greatly fluctuates, and it is therefore difficult to stably obtain a finger vessel image. When fingers are held in contact with the transparent member, which forms the opening portion 3, in registration, on the other hand, fluctuations in distance between the opening portion 3 and the fingers are reduced, and a stable finger vessel image can be obtained.

In order to register a finger vessel image having an even higher level of reproducibility, a finger vessel image is photographed a plurality of times in registration, the degree of similarity between the photographed vessel images is calculated, and one of the finger vessel images that is high in the calculated degree of similarity (at the center of the range of similarity) is selected as registered data. A finger vessel image having high reproducibility in authentication is thus registered, and high precision authentication is consequently accomplished.

In actual running of the registration processing, a user presents a finger a plurality of times to the finger vessel photographing apparatus 2 in registration and, after the finger vessel image registration is completed, can check whether the finger vessel image is properly registered by executing authentication processing with the vessel image photographing apparatus 2 used in the registration. The finger vessel image successfully authenticated in this authentication processing for confirming registration may additionally be registered.

A vessel image is registered to a category corresponding to the finger position and posture in the initial registration and, in authentication for confirming registration, fingers are presented at a finger position and posture corresponding to a category different from the category in the initial registration, so that the finger vessel image is registered to different categories in the initial registration and the additional registration.

This enables the user to register a vessel image to a plurality of categories through just one session of registration processing and processing for confirming the registration, and a balance between high user-friendliness and high authentication precision is accordingly accomplished.

For example, a finger vessel image photographed with fingers held in contact with the transparent member forming the opening portion 3 is registered in the initial registration, and authentication is executed in authentication processing for confirming registration, in a non-contact state in which the fingers are held apart from the opening portion 3. Further, a finger vessel image photographed in the non-contact state is additionally registered, to thereby register finger vessel images of two categories: a category for a state in which fingers are held in contact with the transparent member forming the opening portion 3, and a category for a non-contact state in which fingers are held apart from the opening portion 3. When authentication is executed in actual running by a large number of users in a non-contact state in which fingers are held apart from the apparatus, high precision authentication is accomplished by registering to two categories, namely, a category for the contact state and a category for the non-contact state, in this manner.

As described above, according to the biometric authentication system of the fourth embodiment, the light source 10 configured to irradiate the living body with light is provided above the living body, and the image pickup unit 4 configured to photograph a vessel image with the use of light radiated from the light source 10 and transmitted through the living body is provided below the living body. This enables the system to photograph, when a plurality of fingers (a hand) are presented, the plurality of fingers at the same time, and select a category for each finger for comparison to registered data. In addition, the biometric authentication system of the fourth embodiment can provide highly user-friendly biometric authentication by building a walk-through authentication biometric authentication system.

Fifth Embodiment

In a fifth embodiment of this invention, comparison to biometric information that is registered in a category selected from a plurality of categories is executed for authentication as in the first embodiment, but a surrounding environment in which authentication is executed is recognized, and a category corresponding to the recognized surrounding environment is created in order to register biometric information. A configuration described below is a configuration for accomplishing high precision authentication by comparison to biometric information that is registered in the category corresponding to the surrounding environment. Components and functions in a biometric authentication system according to the fifth embodiment that are the same as those in the embodiments described above are denoted by the same reference symbols, and descriptions thereof are omitted. Features of any one of the first embodiment to the third embodiment may be applied to the fifth embodiment.

Authentication processing and registration processing may be executed in the same manner that is described above in the first embodiment to the third embodiment. In authentication, the surrounding environment, for example, ambient light in an area of a photographed image outside the living body is recognized, and biometric information that is registered to a category corresponding to the recognized surrounding environment and presented biometric information are compared to execute authentication of the user. When the amount of ambient light significantly varies, high precision authentication is accomplished without being affected by fluctuations in position and posture of the living body presented in authentication, by selecting a category to be used in verification based on the surrounding environment.

In registration, luminance information of a near-infrared image at the time of authentication, prior to authentication, or after authentication is used to recognize the surrounding environment, for example, ambient light in an area of a photographed image outside the living body. When there is a large difference between the recognized surrounding environment and the surrounding environment in registration, a category different from one that corresponds to the surrounding environment (a surrounding environment category) in registration is newly created. When authentication succeeds and the surrounding environment category in authentication differs from the surrounding environment category in registration, biometric information obtained in authentication is registered to the new surrounding environment category.

The fifth embodiment ensures high precision authentication even when ambient light in the installation place of a stationarily installed authentication apparatus varies. In a smart phone and other mobile authentication apparatus, the surrounding environment in authentication changes. The fifth embodiment ensures high precision authentication in an authentication apparatus provided in a portable apparatus as well.

As described above, according to the biometric authentication system of the fifth embodiment, the category selection unit 514 selects a category corresponding to authentication biometric information, based on background information that is extracted from an area of a photographed image outside the living body. High precision authentication is therefore accomplished in a biometric authentication system using reflected light. In addition, a category to which biometric information is registered varies depending on the environment of a place in which authentication is executed, and authentication can therefore be executed with high precision. For example, high precision biometric authentication is available by applying the fifth embodiment to a smart phone or a tablet terminal, without providing a biometric sensor for detecting a fingerprint.

The biometric authentication system according to the fifth embodiment is capable of high precision authentication with light of various luminosities and wavelengths, and is therefore not required to include a light source dedicated to biometric authentication.

What is claimed is:

1. A biometric authentication system, which is configured to execute authentication by using registered biometric information, the biometric authentication system comprising:
    a light source unit configured to irradiate a living body with light;
    an image pickup unit configured to photograph a vessel image with light radiated from the light source unit and transmitted through the living body;
    a control unit configured to generate authentication biometric information from the vessel image photographed by the image pickup unit;
    a category selection unit configured to select a category that corresponds to the authentication biometric information, based on supplementary information including information that has been obtained about a position and posture of the living body at timing of photographing the vessel image, wherein the supplementary information further includes contrast value information indicating the sharpness of the vessel image of the authentication biometric information; and an authentication unit configured to execute authentication processing by comparing registered biometric information of the selected category and the authentication biometric information.

2. The biometric authentication system according to claim 1, further comprising a recording unit configured to record the authentication biometric information and the category that corresponds to the authentication biometric information in association with each other.

3. The biometric authentication system according to claim 1, wherein the authentication biometric information is a vessel feature value extracted from the vessel image.

4. The biometric authentication system according to claim 1, further comprising a category creation unit configured to create a category that corresponds to the obtained supplementary information, when, as a result of the comparison by the authentication unit, a degree of dissimilarity between the registered biometric information and the authentication biometric information is higher than a predetermined value.

5. A biometric authentication system, which is configured to execute authentication by using registered biometric information that is registered, the biometric authentication system comprising:

a light source unit, which is provided above a living body, and is configured to irradiate the living body with light;

an image pickup unit, which is provided below the living body, and is configured to photograph a vessel image with light radiated from the light source unit and transmitted through the living body;

a control unit configured to generate authentication biometric information from the vessel image photographed by the image pickup unit;

a category selection unit configured to select a category that corresponds to the authentication biometric information, based on supplementary information including information that has been obtained about a position and posture of the living body at timing of photographing the vessel image, wherein the supplementary information further includes contrast value information indicating the sharpness of the authentication biometric information; and an authentication unit configured to execute authentication processing by comparing registered biometric information of the selected category and the authentication biometric information.

6. The biometric authentication system according to claim 5, further comprising a recording unit configured to record the authentication biometric information and the category that corresponds to the authentication biometric information in association with each other.

7. The biometric authentication system according to claim 5, wherein the authentication biometric information is a vessel feature value extracted from the vessel image.

8. The biometric authentication system according to claim 5, further comprising a category creation unit configured to create a category that corresponds to the obtained supplementary information, when, as a result of the comparison by the authentication unit, a degree of dissimilarity between the registered biometric information and the authentication biometric information is higher than a predetermined value.

9. A biometric authentication system, which is configured to execute authentication by using registered biometric information that is registered, the biometric authentication system comprising:

an image pickup unit configured to photograph an image with light reflected by a living body;

a control unit configured to generate authentication biometric information from the image photographed by the image pickup unit;

a category selection unit configured to select a category that corresponds to the authentication biometric information, based on supplementary information including background information that is extracted from an area of the photographed image outside the living body, wherein the supplementary information further includes contrast value information indicating the sharpness of the authentication biometric information; and an authentication unit configured to execute authentication processing by comparing registered biometric information of the selected category and the authentication biometric information.

10. The biometric authentication system according to claim 9, further comprising a recording unit configured to record the authentication biometric information and the category that corresponds to the authentication biometric information in association with each other.

11. The biometric authentication system according to claim 9, wherein the authentication biometric information is a vessel feature value extracted from the photographed image.

12. The biometric authentication system according to claim 9, further comprising a category creation unit configured to create a category that corresponds to the supplementary information, when, as a result of the comparison by the authentication unit, that a degree of dissimilarity between the registered biometric information and the authentication biometric information is higher than a predetermined value.

* * * * *